W. R. SEIGLE.
MACHINE FOR CURING LAMINATED PAPER TUBES AND THE LIKE.
APPLICATION FILED AUG. 31, 1910.
1,005,335.
Patented Oct. 10, 1911.
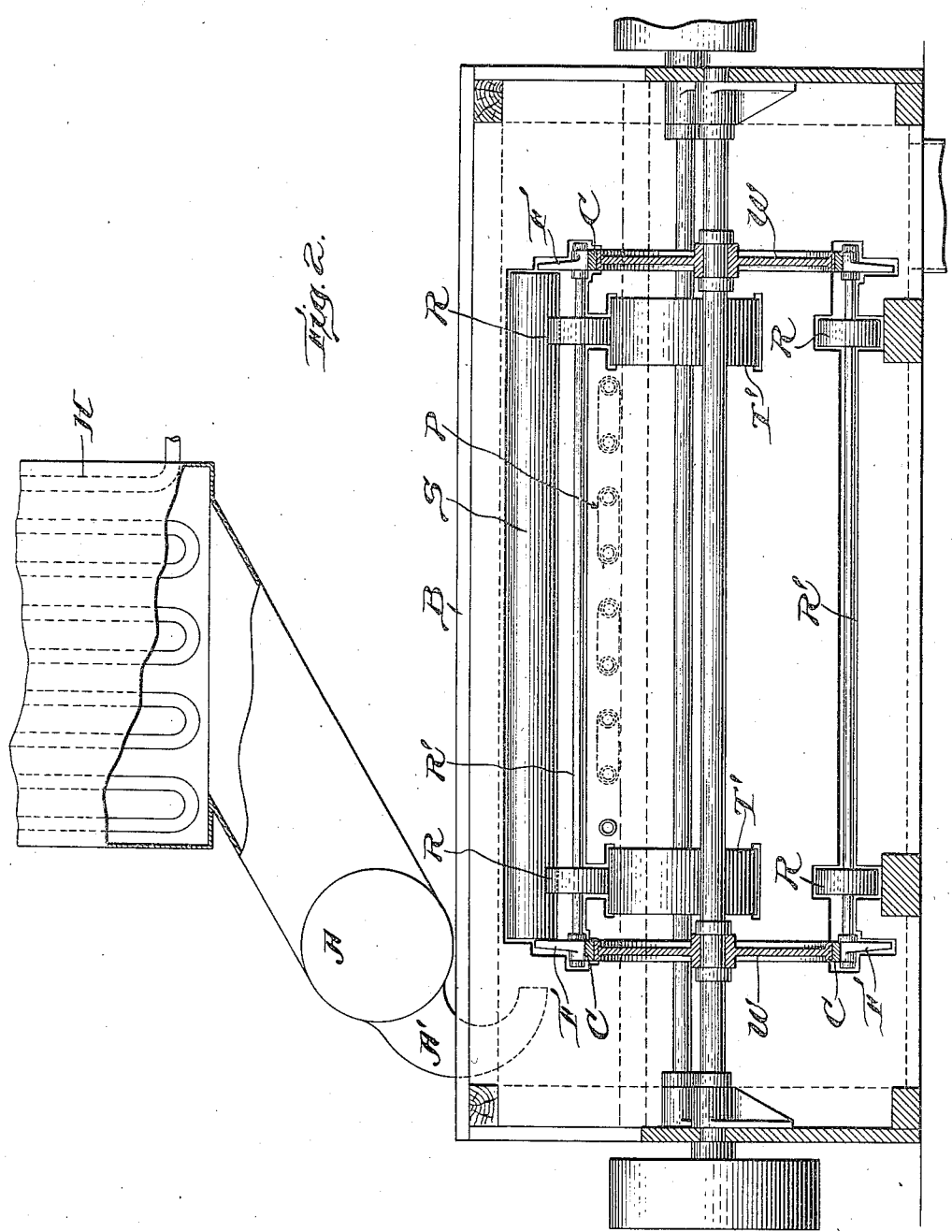

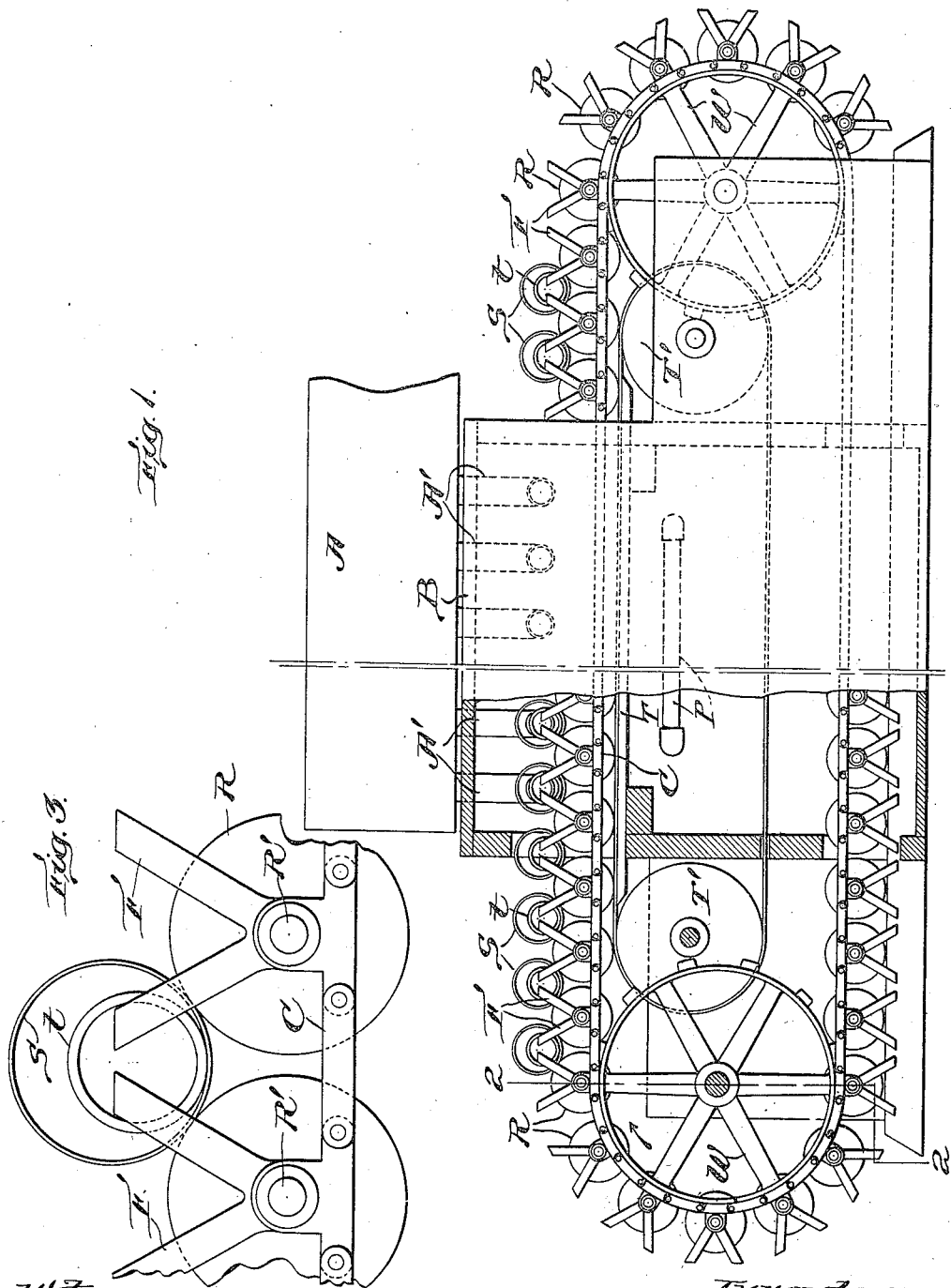

UNITED STATES PATENT OFFICE.

WILLIAM R. SEIGLE, OF NASHUA, NEW HAMPSHIRE, ASSIGNOR TO H. W. JOHNS-MANVILLE COMPANY, OF NEW YORK, N. Y., A CORPORATION OF NEW YORK.

MACHINE FOR CURING LAMINATED PAPER TUBES AND THE LIKE.

1,005,335. Specification of Letters Patent. Patented Oct. 10, 1911.

Application filed August 31, 1910. Serial No. 579,883.

*To all whom it may concern:*

Be it known that I, WILLIAM R. SEIGLE, a citizen of the United States, and resident of Nashua, in the county of Hillsboro and State of New Hampshire, have invented new and useful Improvements in Machines for Curing Laminated Paper Tubes and the Like, of which the following is a specification.

My invention relates to the curing of newly made laminated paper tubes and like articles which contain water by reason of the process of their manufacture, and which consequently have to be relieved of the water held in suspension to be ready for use or for further steps in manufacture. While such articles are fresh and impregnated with water, they are relatively soft and plastic, and in danger of settling out of true shape unless adequately supported. The provision of supports to hold tubes of this general character in shape until they dry and become relatively hard and stiff, has heretofore taken various forms, all of which, while furnishing the needful support, retard the evaporation of the water in the tube by covering either the inner or outer surfaces thereof.

The object of my invention is to supply tubes of the general character indicated with adequate support during the drying process, and at the same time have all surfaces of the tube in free contact with the drying atmosphere which surrounds, or is made to circulate about, them.

My invention herein described and claimed, consists in mechanism by which to cure laminated paper tubes and like articles, and the operation of such mechanism incidentally involves the performance of a new method of curing newly made laminated paper tubes and analogous articles, which is characterized by the attainment of the above-stated object, and which, though it may be practiced by the aid of specifically various forms of apparatus or machinery, or conducted by hand, is, I believe, best carried out with a machine such as I describe herein, and which constitutes an example of my invention. The said method or process is shown, described and claimed in an application for patent filed concurrently herewith, by me, Serial No. 579,884.

As the practical object of my invention is to shorten the time—and therefore the expense—of curing tubes of the character indicated, as well as to preserve their correct shape during the drying or curing process, an important physical condition is the exposure of all parts of the tube to the drying atmosphere—which may with advantage be circulated both inside and around the tube— so that from each part of the tube surface the evaporation of water may proceed without restraint. On the other hand, an at least equally important physical condition—practically considered—is the adequate support of the tube during its wet condition, so that it may not, of its own weight, become distorted from true shape. These two important and desirable physical conditions are, or have been heretofore, irreconcilable; and, as the retention of true shape by the tube is, in the final event an indispensable requisite, quick drying has been sacrificed to adequate support, the supporting devices having been such as to cover large portions of the tube-surface, either inside or outside, and thus to retard the evaporation of water.

My invention is characterized by the reconciliation of these two heretofore conflicting requisites; by its employment tubes of the character indicated are adequately supported during the entire curing operation, and at the same time have their entire surfaces exposed to the drying atmosphere.

Essentially, the support of each tube, according to my invention, moves progressively around the tube, the support being substantially along a line only, the shifting of the line of support being sufficiently rapid to afford no opportunity for the tube to sag or collapse, as it would if supported at rest, in relation to the supporting means. Thus, the line, or narrow band of contact between the tube and its support, is constantly changing position in the tube-surface, giving full opportunity for evaporation from all parts of the tube-surface all the time. The best mode, as I believe, of obtaining these results, is to support the tube horizontally in a cylinder open for the ready reception into its interior of the tube to be dried or cured and to produce progressive rolling contact between the tube and its support, while circulating hot air, or other drying medium, through and around the tube.

In the drawings hereto annexed, which show a concrete example of my invention,—Figure 1 is a side elevation of a portion of the machine, the casing thereof being shown in section; Fig. 2 is an end elevation, partly in section at the line 2—2 of Fig. 1; and Fig. 3 is a detail on larger scale, showing a tube holder and part of the conveyer.

Referring to Figs. 1 and 2:—A chain conveyer C runs on sprocket wheels W, which are driven by any suitable means. Forks F are secured to links of the chains, and comprise bearings for shafts R' of rollers R. A track T, consisting of an endless belt carried by belt-wheels T' lies under the rollers R at each side of the machine. On these tracks the rollers R travel, as they are advanced by the conveyer, so that rolling movement may be imparted to the rollers. By giving the belts, which constitute the tracks T, an independent movement, the rate of rolling or rotation of the rollers R may be accelerated or retarded. No means for rotating the belt-wheels T' is shown, as any suitable mode of driving them may be employed. The conveyer chains C, with the above mentioned parts carried thereby, and the track-belts T, are for the greater part housed in a case or box B, in which a grid of steam pipes P may be placed, and into which air may be blown, as through a duct A and nozzles A', by any suitable fan or blower. The air thus blown into the box or case B may, if desired, be heated by passing through a stack of heated pipes conventionally indicated at H in Fig. 2.

The machine is equipped with a set of tubular holders S, preferably of thin metal, and of such size as to admit freely a tube $t$ of laminated paper or like material. As the tubes $t$ come wet from the machine by which they are made, they are slipped one by one into the supports or holders S, which are then laid on the rollers R, between the forks F, which prevent the supporting pipes or tubes $t$ from working off the conveyer.

As the rolls R advance through the case B, they turn, causing the supporting pipes S to roll also, and the tubes $t$ to roll on their supports. This rolling motion, being constant, prevents each tube $t$ from sagging and becoming distorted before being completely dried. The contact between the tube $t$ and its support is always along a line, so that substantially the entire inner and outer surface of the tube $t$ is exposed to the drying atmosphere, and the greatest possible opportunity is afforded for the evaporation of moisture from the tube $t$.

The hot air in the case B is preferably removed and circulated, as by the blowing apparatus and air ducts A and A', which, as shown, blow air over and through the tubes $t$. The heater pipes P also assist in drying the tubes.

The rate at which the tubes $t$ are made to travel and roll, will depend on the thickness and size of the tubes, the length of the drying case or chamber, and the efficiency of the drying atmosphere employed, and should be so adjusted that tubes $t$ as they emerge from the case B, will be thoroughly dry and therefore stiff. By this means thorough and rapid drying is effected, consistently with the maintenance of adequate support for the tubes during the curing process.

By employing a drying case one hundred feet long, and circulating hot air freely therein, three-inch laminated paper tubes with walls one quarter of an inch thick, can be completely cured by allowing each tube to occupy four hours in transit from one end of the case to the other, the rolling movement caused by the mechanism above described being adequate in the meantime to prevent distortion of the tubes.

What I claim and desire to secure by Letters Patent is:—

1. In a machine for curing newly-made laminated paper tubes and the like, the combination of a conveyer, comprising a series of supporting rolls, a track for said rolls, and cylinders open for the reception into their interiors of the articles to be cured, to hold said articles loosely in substantially horizontal position, said cylinders resting on and rotated by the supporting rolls during conveyance.

2. In a machine for curing newly made laminated paper tubes and the like, the combination of a conveyer, cylinders, open for the reception into their interiors of the articles to be cured, to hold said articles loosely in substantially horizontal position, said cylinders engaged and moved by the conveyer, and means to rotate said cylinders during conveyance, and means to circulate a drying atmosphere within the cylinders.

3. In a machine for curing newly-made laminated paper tubes and the like, the combination of a conveyer, comprising a series of supporting rolls, a track for said rolls, and cylinders open for the reception into their interiors of the articles to be cured, to hold said articles loosely in substantially horizontal position, said cylinders resting on and rotated by the supporting rolls during conveyance, and means to circulate a drying atmosphere within the cylinders.

Signed by me at Nashua, New Hampshire, this twelfth day of August 1910.

WILLIAM R. SEIGLE.

Witnesses:
CHARLES E. POTTER,
EUGENE W. LESLIE.